(12) United States Patent
Gajdosik et al.

(10) Patent No.: US 6,599,573 B2
(45) Date of Patent: Jul. 29, 2003

(54) MANUFACTURING PROCESS OF CHRISTMAS TREE DECORATIONS AND RACKS FOR THEIR FIXING DURING THIS PROCESS

(75) Inventors: Jan Gajdosik, Vsetin (CZ); Jaroslav Trtik, Vsetin (CZ)

(73) Assignee: Vyrobni Druzstvo Irisa, Vsetin (CZ)

( * ) Notice: Subject to any disclaimer, the term of this patent is extended or adjusted under 35 U.S.C. 154(b) by 0 days.

(21) Appl. No.: 10/089,573

(22) PCT Filed: Jul. 26, 2001

(86) PCT No.: PCT/CZ01/00040
§ 371 (c)(1),
(2), (4) Date: Mar. 29, 2002

(87) PCT Pub. No.: WO02/10084
PCT Pub. Date: Feb. 7, 2002

(65) Prior Publication Data
US 2002/0150680 A1 Oct. 17, 2002

(30) Foreign Application Priority Data
Aug. 2, 2000 (CZ) ..................................... PV 2000-2811

(51) Int. Cl.[7] ........................... B05D 1/32; C23C 16/06; B05C 13/02
(52) U.S. Cl. .................. 427/255.11; 427/282; 427/294; 118/723 VE; 118/730; 118/503
(58) Field of Search ........................ 427/180, 190–192, 427/197, 205, 294, 250, 255.11, 255.19, 282; 65/60.1, 60.4–60.53; 118/720, 721, 728, 730, 500, 503, 723 VE

(56) References Cited

U.S. PATENT DOCUMENTS

| | | | | |
|---|---|---|---|---|
| 2,860,075 A | * | 11/1958 | Alexander et al. | |
| 3,676,214 A | * | 7/1972 | English et al. | |
| 3,775,157 A | * | 11/1973 | Fronson | |
| 5,487,927 A | * | 1/1996 | Kamen et al. | |

FOREIGN PATENT DOCUMENTS

| | | |
|---|---|---|
| DE | 93 02 893 U | 4/1993 |
| EP | 0 270 024 A | 6/1988 |

* cited by examiner

Primary Examiner—Fred J. Parker
(74) Attorney, Agent, or Firm—Harrison & Egbert

(57) ABSTRACT

A manufacturing process of Christmas tree decorations where glass half-products are first blown to required dimensions and shapes, including the process stem. This glass half-product is fixed into the rack and placed into the metal-coating device where, under vacuum conditions, a thin (1 to 7 microns) layer of metals and/or their alloys is coated on its surface by vacuum plating or vacuum powder coating processes. The metal-coated surfaces created this way may be finished in various colors using clear and color varnishes either gloss or matt. The glass half-products for Christmas tree decorations may be provided with masking in the place of intended decor before the half-product is put into the vacuum metal-coating device. After the masking elements are removed, clear non-coated spots are created on the decoration surfaces. The rack accommodating the glass half-products of decorations is for their placement into the metal-coating device when above methods are performed.

11 Claims, 5 Drawing Sheets

MANUFACTURING PROCESS OF CHRISTMAS TREE DECORATIONS AND RACKS FOR THEIR FIXING DURING THIS PROCESS

TECHNICAL FIELD OF THE INVENTION

The invention involves a manufacturing process of Christmas tree decorations, especially those with ornaments and racks for fixing the decorations during their processing by vacuum technology.

BACKGROUND OF THE INVENTION

At present, Christmas tree decorations are manufactured in the way where glass half-products are blown, either manually or by a machine, to required dimensions and shapes, including the process stem. Half-products are then left clear or they can be further coloured and ornamented (fitted with a decor) or they can be silver-plated with consequent colouring and ornamenting operations.

The principle of silver-plating operation is to coat glass half-product internal surfaces with a thin silver layer. For these purposes reduction of silver nitrate complex solution by sodium tartrate, or by other reducing agents, are used. This method has its drawback in using ammonia for transfer of silver nitrate into the complex solution. Apart from the thin layer of silver coating (2 to 4 microns) on the inner surface of the Christmas tree decoration half-product, hazardous chemical compounds that must be disposed of in an environmentally friendly way, also result in this reaction. Moreover, silver nitrate also belongs among hazardous chemicals and its handling is therefore difficult. Operators must wear breathing protection, rubber aprons, rubber boots and gloves to be protected against breathing ammonia vapours or skin contact with silver-plating solutions. Operators also must attend an annual medical inspection.

SUMMARY OF THE INVENTION

The above-mentioned problems are eliminated in the manufacturing process of Christmas tree decorations where glass half-products are blown to required dimensions and shapes, including the process stem. The new process principle is based on the idea that the glass half-product is fixed into the rack first and then placed into the metal-coating device where, under vacuum conditions, a thin (1 to 7 microns) layer of metals and/or their alloys is coated on its surface by vacuum plating or vacuum powder coating processes. Metal-coated surfaces created this way may be finished in various colours using clear and colour varnishes either glossy or matt. For vacuum plating or vacuum powder coating processes some of the following metals, or their alloys, can be used: aluminium, copper, iron, nickel, silver, gold, magnesium, tin, chromium, vanadium and zinc.

Before placed into the metal-coating device, the glass half-products for Christmas tree decorations can be suitably masked in the places of intended future ornaments leaving thus, after the coating process and mask removal, transparent uncoated places.

This masking can be achieved by various methods. In one of them the glass half-products for Christmas tree decorations are laid into a cavity of a masking fixture. The cavity exactly follows the glass half-product shape and size in a selected parting plane that can be changed according to selected ornament patterns. A part of the glass half-product is inserted into the cavity and thus protected against metal-coating and only the part projecting out of it is then metal-coated. The parting plane and its shape are made of flexible material providing good adhesion to the glass half-product and secure placement inside Christmas tree decoration is removed from the rack.

Another possibility how to mask desired placed consists of placing at least one removable cover on the glass half-product for Christmas tree decoration. The cover matches the required decor size and shape and closely fits to this surface. Before the coloration process, the cover is removed. The cover may be suitably provided with a sticking surface for a better adhesion to the half-product.

Still another masking method is based on coating the desired places on the surface of glass half-product for Christmas tree decoration with a thin layer of removable substances, like varnishes, that can be easily removed after metal-coating is finished. Coloration processes by clear or colored paints or matt paints may be performed either before or after the removable layer of varnish is taken away.

The above shown masking methods can be arbitrarily combined in a product.

Depending on half product types, various racks are used for fixing of glass half-products for Christmas tree decorations in the metal-coating device. One of possible designs is that the rack consists of a plastic or metal channel containing at least one flexible cover with at least one cavity. This flexible cover is then fixed inside the channel by strutting between the channel side tags. At opposite ends of its lengthwise centre line, the channel is provided with two side pivots to be mounted into journal bearings positioned at opposite sides on the perimeter of working rotating drum of the metal-coating device.

Another possibility of rack design a rack consisting of a bearing metal/plastic rod provided with pivots at its ends to be accommodated in journal bearings located at opposite positions on the perimeter of working rotating drum of the metal-coating device. Crosswise the bearing rod centre-line, sliding/swinging metal/plastic arms are mounted on the rod. The arms are equipped with, at least, one clamp for accommodating and fixing the glass half-product stem. In order to adjust optimum spacing of separate glass half-products for Christmas tree decorations, the arms are provided with locking elements.

One of possible options of the above rack design is represented by an arrangement where the arms are fixed to the bearing rod by one of their ends while the arms are assembled in couples mutually reversed by 90°. Arms in one couple are positioned one against the other so that one of them is fixed over the bearing rod and the other under it. Clamps for fixing the glass half-product stem are positioned across the longitudinal axis of their relevant arms consisting of two 'V'-shaped jaws that are fitted on their inner sides with saw-tooth notches or roughened surface to accommodate and fix the stem. Active clamp parts of the same arm couples are mutually reversed by 180°.

Another of possible options of the above rack design is represented by an arrangement where the arms are fixed to the bearing rod by their centres bearing at each their end couples of opposed clamps consisting of two 'V'-shaped jaws that are fitted on their inner sides with saw-tooth notches or roughened surface to accommodate and fix the stem. Active clamp parts of the same arm couples are mutually reversed by 180° and clamp couples positioned at the opposite arm ends and clamp couples at the same ends of neighbouring parallel arms are also reversed by 180° by its active parts.

If glass half-products for Christmas tree spires are to be accommodated, the rack is designed so that the arms are created by a pre-stressed metal belt fixed at its centre to the bearing rod. The arms are arranged into opposed clamp couples so that each couple arms are closely fitted one to another and the arms are mutually reversed by 90°. At one arm end, fixings in a form of a conical plug are prepared to accommodate the end of the Christmas tree spire stems. At the opposite clamp couples of the same side, there are fixings shaped as cavities to accommodate the tips of the Christmas tree spires. Counterwise arm couples are mutually reversed by 90° so that the conical plugs of one couple are coaxial to the opposite couple cavities.

The above manufacturing process of Christmas tree decorations offers a great advantage in the elimination of conventional silver-plating in silver nitrate solutions and reducing agents, i.e. including ammonia, which means that this is a very suitable, environmentally & health friendly manufacturing -process. Another advantage is that the above process enables to produce completely new products where on surfaces of Christmas tree decorations transparent places are created that may be left either clear or further colour modified or decorated by ornaments.

BRIEF DESCRIPTION OF THE DRAWINGS

The subject of said design, in particular the racks for stacking of glass products into the drum of vacuum metal-coating device, will be described below by the use of herewith enclosed drawings.

FIG. 3 shows a block diagram an example of flexible cover material, while

EXAMPLES OF THE EMBODIMENT OF THE INVENTION

In the manufacturing process of Christmas tree decorations, the glass half-product 1 of required size and shape is blown first in a traditional way; the half-product is fitted with the handling stem at its end. This way obtained glass half-product 1 is then fixed into a rack suitable to the half-product type as described below. The rack accommodating the glass half-products 1 is then placed into the metal-coating device. In this device, using the process of vacuum metal-coating or powder-coating, thin layers of metals and/or their alloys (1 to 7 microns thick) are formed on the treated surfaces. The layer thickness is specified according to the necessity to provide its non-transparency. The following metals, or their alloys, can be used in this operation: aluminium, copper, iron, nickel, silver, gold, magnesium, tin, chromium, vanadium and zinc. After the coating is complete, the glass half-products 1 are colour-treated by coating with clear or colour glossy varnishes or colour matt ones or by removal of a layer of removable material with consequent colour-treating.

In order to obtain Christmas tree decorations with ornaments (decor) the above method is modified so that the glass half-products 1 are fitted with masking covers (shades) in the places of intended decors before they are placed in the vacuum coating device. After the masking are removed, transparent placed are left on the surfaces of Christmas tree decorations corresponding by their respective shapes to the mask types used.

Figure 1:
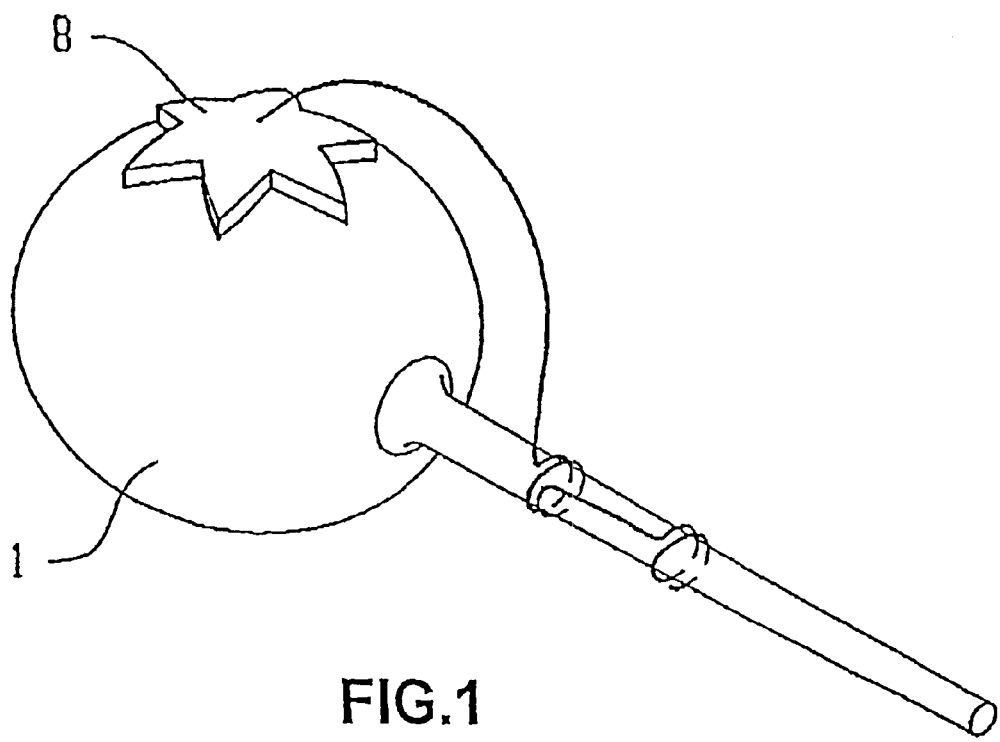
FIGS. 1 and 2 show examples of shading options using the removable covers.
Figure 2:
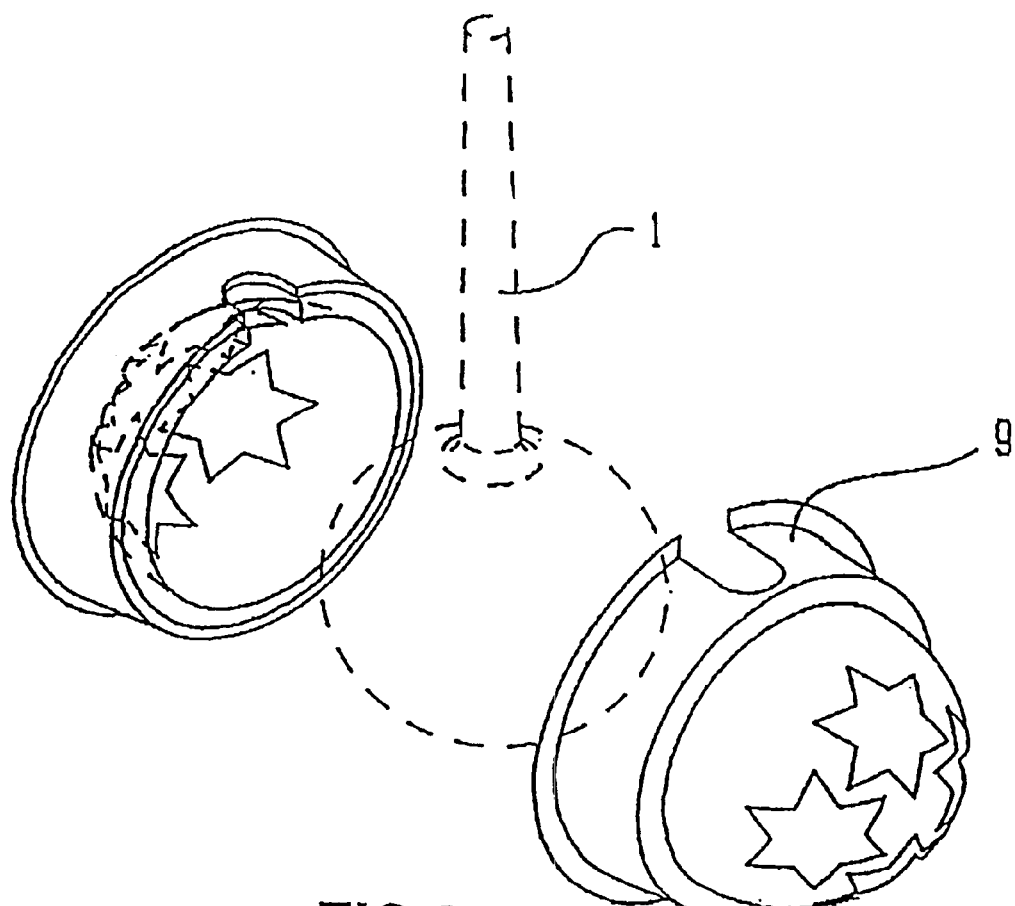

The simplest way is to use at least one removable masking cover 8 or 9 as shown in FIGS. 1 and 2. The masking covers 8 and 9 are in the shape of the decor required and they can be provided with an adhesive agent on their contact faces with the half-products. Before subsequent coloring operations the masking covers 8 or 9 are removed.

Figure 3:
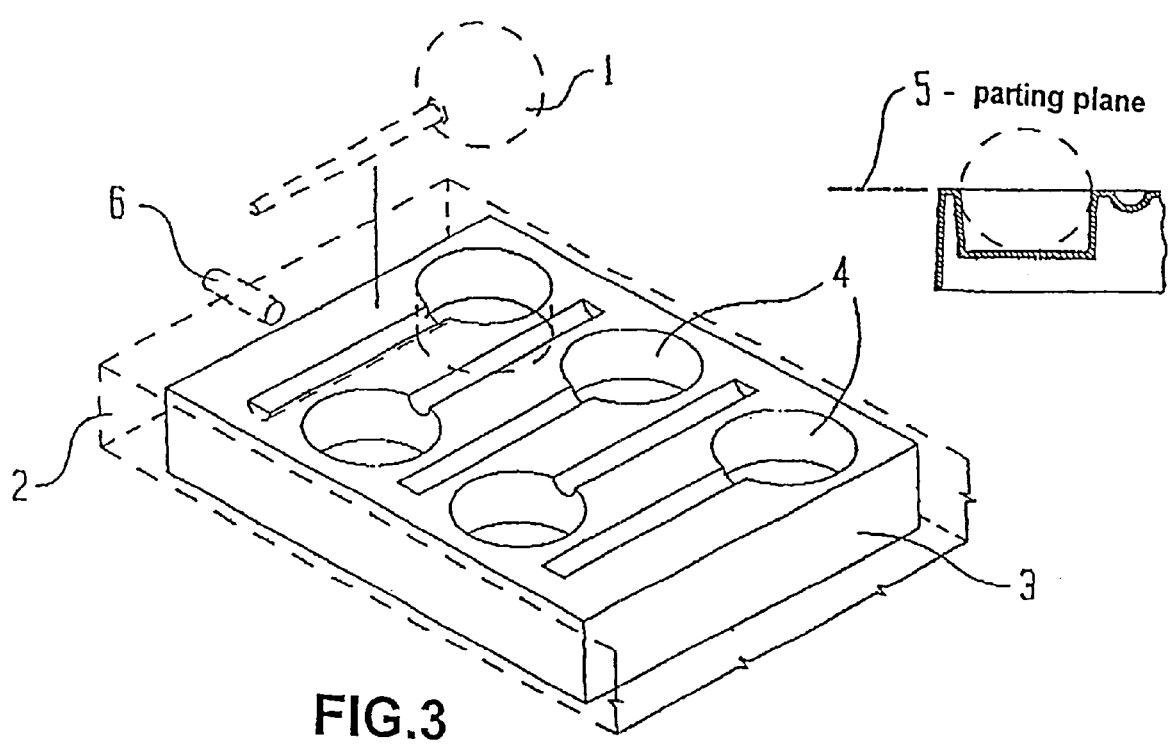
Figure 4:
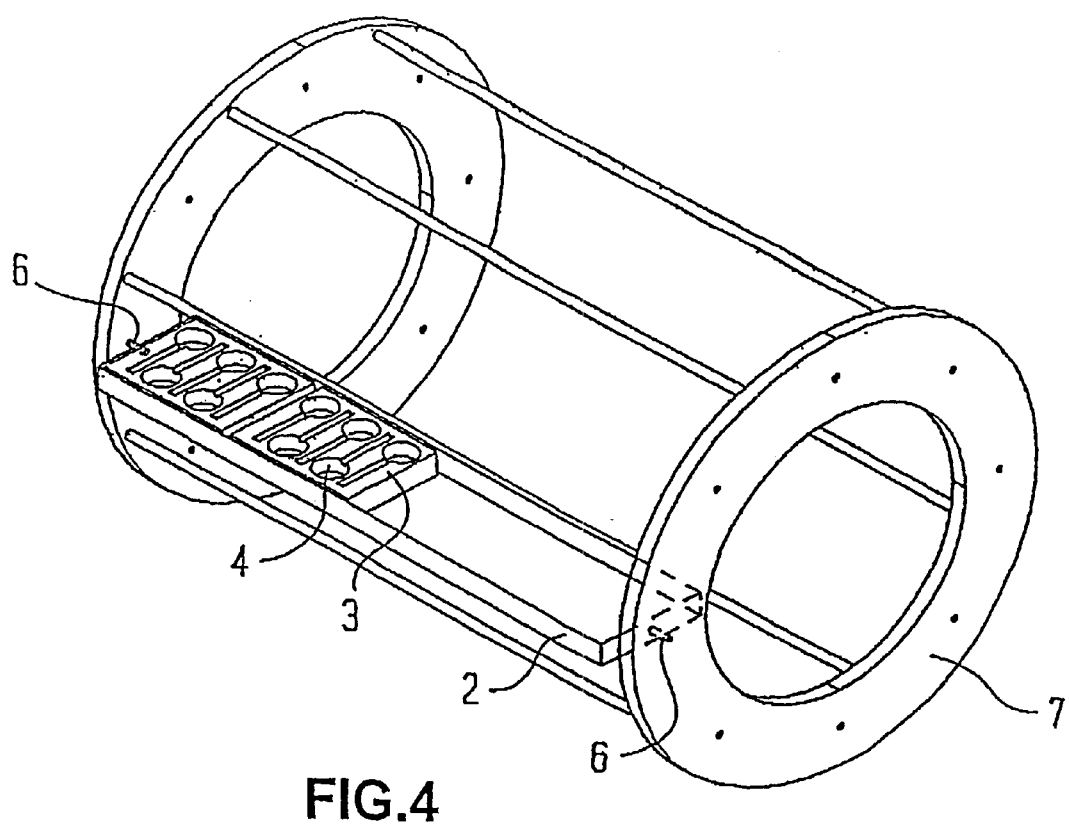
FIG. 4 shows its placement into the drum of vacuum metal-coating device.

Another possibility how to perform the masking is shown in FIGS. 3 and 4. In this case, the glass half-products for Christmas tree decorations 1 are placed in the cavity 4 of the masking fixture 3. The cavity 4 exactly matches the size and shape of the glass-half product 1 at the selected parting plane 5, which determines what part of the glass-half product 1 is covered and the shape of which corresponds to the required decor (ornament). A part of the glass-half product 1 is thus inserted inside the cavity 4 and protected against coating with metals as only the part projecting out of the cavity 4 of the masking fixture 3. In practical use the masking fixture has more than one cavity 4 and it is made of flexible materials like plastics or rubber, which facilitates the adhesion to the glass half-product and its fixing in the masking fixture 3. The masking fixture 3 is then placed into a plastic or metal channel 2, into which several masking fixtures 3 may be placed at the same time and they are fixed in the metal channel 2 by strutting between its side tags. In its lengthwise center line at its opposite ends, the channel 2 is provided with two side pivots 6 for the accommodation into the journal bearings positioned on the opposite sides along the perimeter of the working rotating drum 7 of the vacuum metal-coating device as shown in FIG. 4. Coloring operations are performed on Christmas tree decorations after they are removed from the rack.

Masking can be also made in the way that surfaces of the glass half-products 1 for Christmas tree decorations are in the places of future decor placement are coated with a layer of removable material—like varnish—that can be taken away after metal-coating operations. Coloration processes by clear or colored paints or matt paints may be performed either before or after the removable layer of varnish is taken away.

The above mentioned masking methods can be arbitrarily combined at single product.

Figure 5:
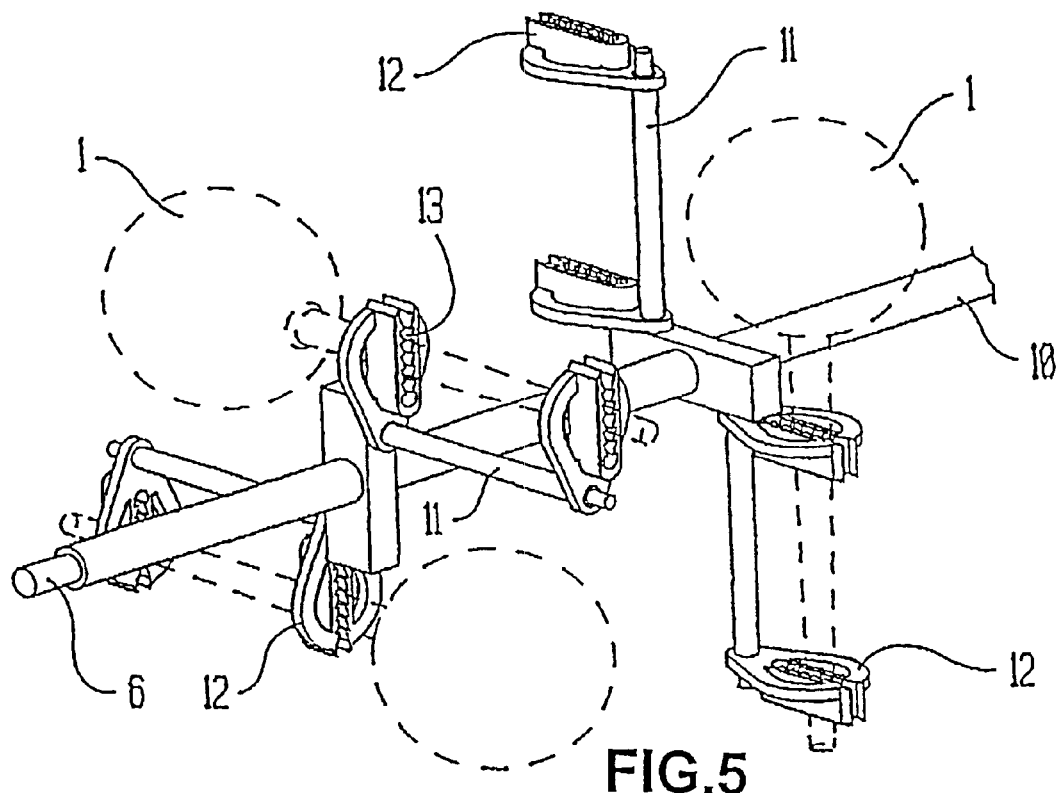
FIGS. 5, 7 and 9 show examples of some more rack types for fixing of glass half-products for Christmas tree decorations and FIGS. 6, 8 and 10 showing their accommodation in the drum of vacuum metal-coating device.
Figure 7:
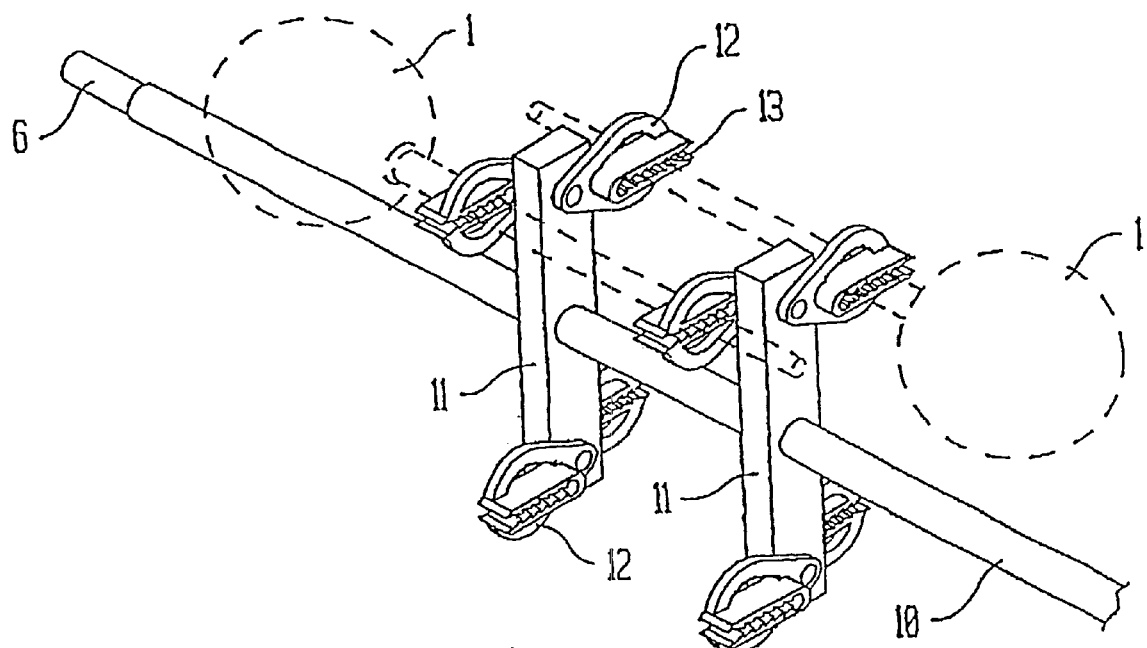
Figure 9:
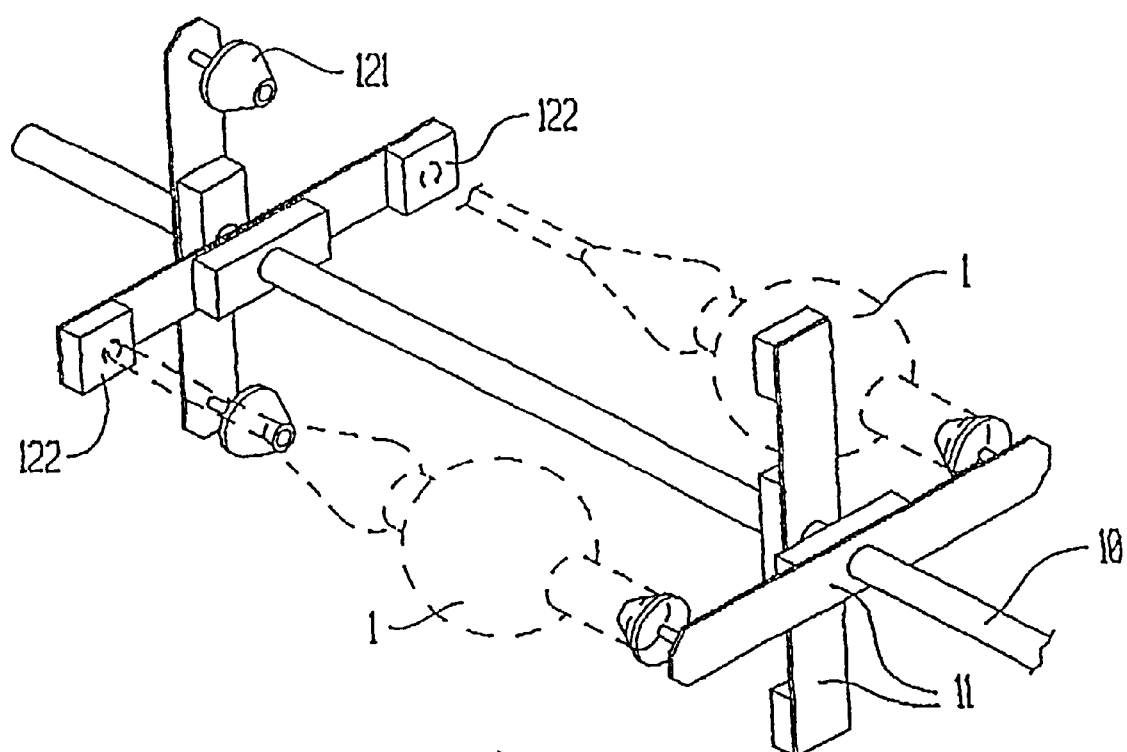

Apart from the already mentioned rack for fixing of the glass half-products 1 shaped into the channel 2 and flexible shading fixtures 3, other racks/fixtures may be used as well. These possibilities are shown in FIGS. 5, 7 and 9. In all cases the racks are formed with a holder consisting of bearing rod 10 (made of metal or plastic materials) provided at its ends with pivots 6 for fitting to journal bearings positioned in opposite places along the perimeter of the rotating drum 7 of vacuum metal-coating device. On this bearing rod 10 metal or plastic arms 11 are perpendicularly attached in a mounting type enabling their rotation and sliding along the rod axis. The arms 11 are provided with at least one clamp 12 or 121 or/and 122 for accommodation and fixing of the stem of the glass half-products 1 for Christmas tree decorations. These arms 11 are equipped with arresting/locking elements to keep optimal spacing of accommodation of separate glass half-products 1 for Christmas tree decorations.

One option of the above mentioned design is in FIG. 5. The arms 11 are here fixed to the bearing bar 10 by its one end forming thus couples of arms mutually reversed by 90°.

Figure 6:
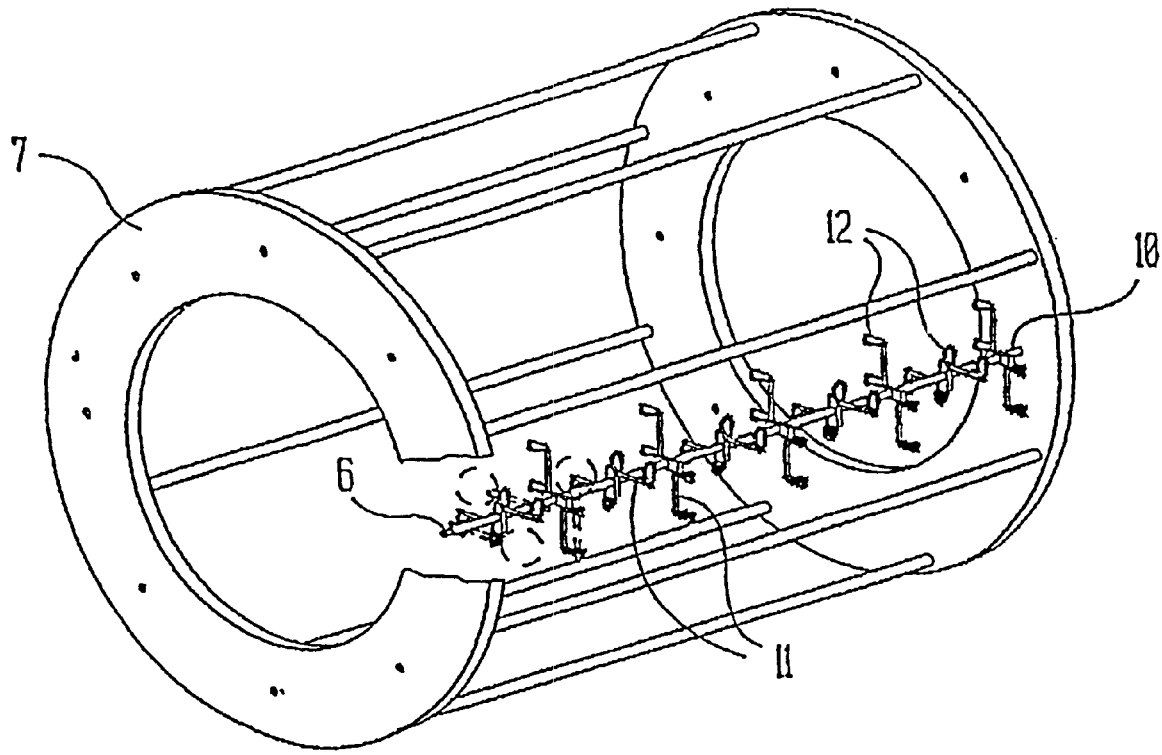

The arms 11 belonging to one couple are opposite positioned so that one arm is fixed over the bearing rod 10 while the other underneath. The clamps 12 for fixing of the glass half-product 1 stem are positioned perpendicularly to the lengthwise centre line of their arms 11 and they are formed with 'V'-shaped jaws that are fitted on their inner sides with saw-tooth notches 13 to accommodate and fix the stem. Instead of the saw-tooth notches 13 their inner surfaces may be formed to make cavities or roughened. Active clamp 12 parts at the same arm 11 couples are mutually reversed by 180°. These fixing designs in the drum 7 of vacuum metal-coating device are shown in FIG. 6.

Figure 8:
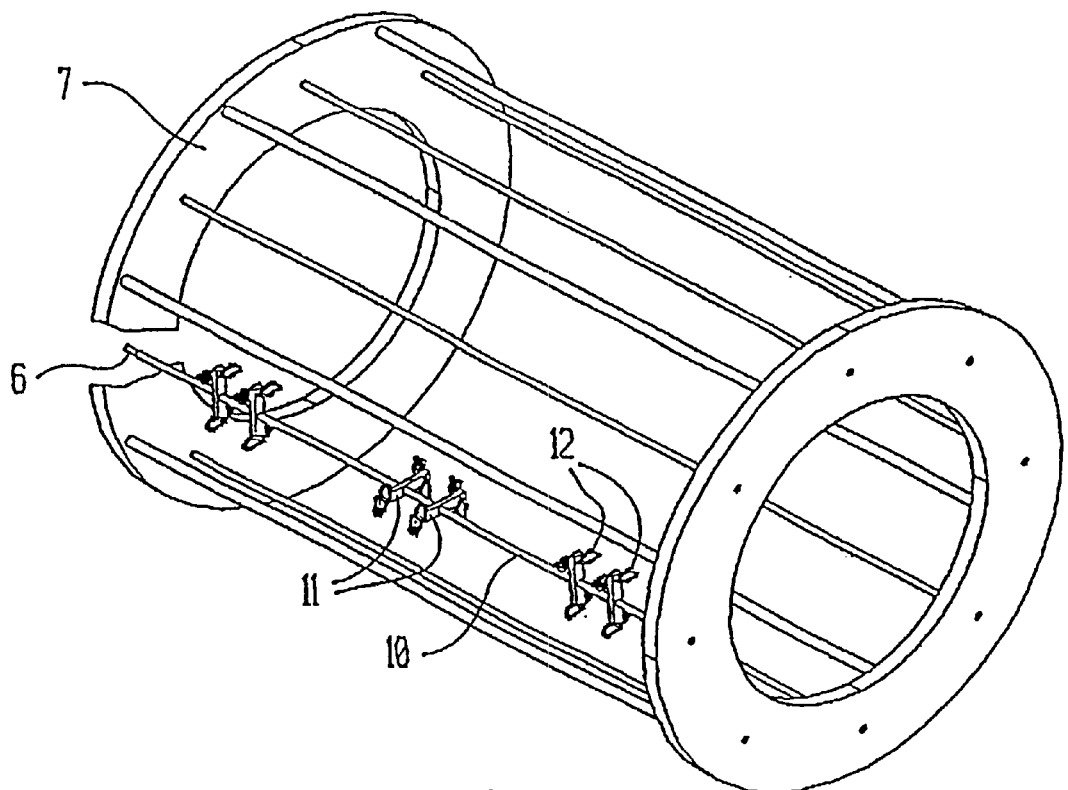

Another option of this design (see FIG. 7) is formed by the idea where arms 11 are fixed to the metal bearing rod 10 in their centers. At each of their ends a couple of opposite clamps 12 is fixed. The clamps again are formed with 'V'-shaped jaws that are fitted on their inner sides with saw-tooth notches 13 to accommodate and fix the stem of the glass half-product 1. Active clamp 12 parts in one couple are mutually reversed by 180°. Clamp couples 12 placed at the opposite arm ends 11 and clamp couples placed always at the neighbouring parallel arm 11 ends are also reversed by their active parts by 180°. This rack type is accommodated in the drum 7 of vacuum metal-coating device as shown in FIG. 8.

Figure 10:
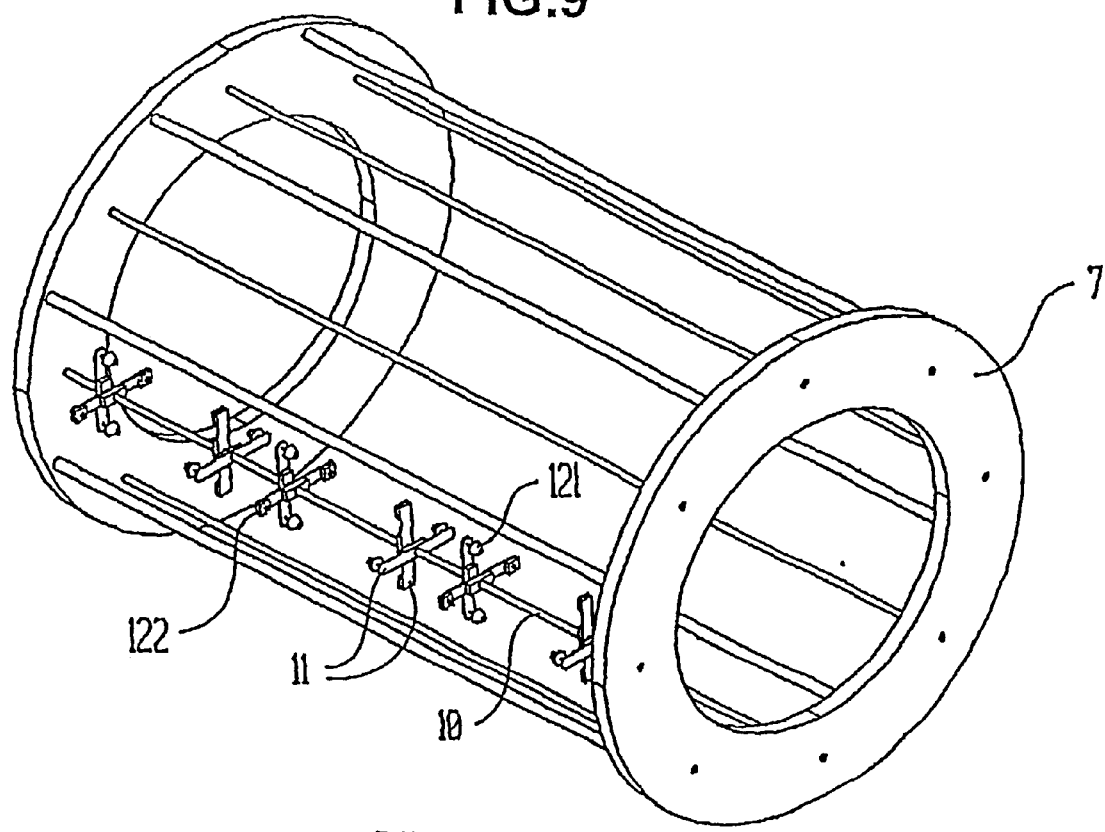

If glass half-products 1 for Christmas tree spires are involved, they can be accommodated as shown in FIG. 9 and placed into the drum 7 of metal-coating device as shown in FIG. 10. In this case, the rack is designed so that the arms 11 are created by a pre-stressed metal belt fixed at its centre to the bearing rod 10. The arms 11 are arranged into opposed clamp couples so that each couple arms are closely fitted one to another and the arms are mutually reversed by 90°. At one arm 11 end, fixing in a form of a conical plug 121 are prepared to accommodate the end of the Christmas tree spire stems. At the opposite arm 11 couples of the same side, there are fixings 122 shaped as cavities to accommodate the tips of the glass half-product 1 of Christmas tree spires. Counterwise arm 11 couples are mutually reversed by 90° so that the conical plugs 121 of one couple are coaxial to the opposite couple cavities 122 of the opposite arm 11 couple.

Industrial Applicability

The above mentioned manufacturing process of Christmas tree decorations is suitable for production of any decorations where, in the final result, it is required to create vacant spots on the decoration half-product, either left clear and without any decor or further treated in colouring processes or fitting them with a decor or combination of both. Wholly metal-coated decorations can be prepared by this method as a replacement of silver using processes. This manufacturing process is environmentally friendly as it eliminates adverse health impacts to operators.

What is claimed is:

1. A process for manufacturing Christmas tree ornaments comprising:

blowing a glass half-product having a process stem;

fixing the blown glass half-product into a fixture;

masking the blown glass half-product with a mask of a desired size and shape;

metallizing a layer of metals or alloys thereof onto a surface of the masked glass half-product by vacuum metallization, said layer of metals or alloys selected from the group consisting of aluminum, copper, iron, nickel, silver, gold, magnesium, tin, chromium, vanadium and zinc, said layer having a thickness of between 1 and 7 microns;

removing the mask from the metallized glass half-product so as to expose transparent uncoated places on the metallized glass half-product; and coating the metallized glass half-product with a layer of a clear or colored glossy varnish or with a layer of a clear or colored matt varnish.

2. The process of claim 1, said step of masking comprising:

placing the glass half-product into a cavity, said cavity matching a desired size and shape of the glass half-product in a parting plane of said cavity, a part of the glass half-product within said cavity being masked by said cavity, another part of the glass half-product projecting out of said cavity being metallized in said step of metallizing, said cavity comprised of a flexible material adhesively receiving the glass half-product in said cavity, said step of coating occurring after said step of removing the mask.

3. The process of claim 1, said step of masking comprising:

providing at least one removable cover on a surface of the glass half-product; and securing the removable cover to said surface by a flexible holder.

4. The process of claim 3, the removable cover having an adhesive coating on one side thereof, said step of securing comprising:

adhering the adhesive coating to said surface of the glass half-product.

5. The process of claim 1, said step of masking comprising:

forming a film of a removable substance onto a surface of the glass half-product.

6. The process of claim 5, said step of removing the mask comprising:

removing said film from said surface of said glass half-product, said step of coating occurring after said step of removing said film.

7. A fixture for placement of a glass half-product into a metal-coating device comprising:

a channel of a plastic or metal material; and at least one flexible masking means having at least one cavity positioned within said channel, said masking means for masking the glass half-product with a mask of a desired size or shape, the masking mens being fixed in said channel by strutting between side tags of said channel, said channel having two side pivots respectively on opposite sides thereof along a longitudinal axis thereof, said two side pivots being suitable for receipt within journal bearings of a rotating drum of the metal-coating device.

8. A fixture for placement of a glass half-product into a metal-coating device comprising:

a holder having a supporting rod;

a plurality of arms each having at least one clamp means, said clamp means for receiving and fixing the half-products therein, said plurality of arms being perpendicularly attached to and along a longitudinal axis of said supporting rod, said plurality of arms having a locking mens thereon for spacing adjacent glass half-product from each other; and pivot means formed at respective ends of said holder, said pivot means for fitting into journal bearings positioned in opposite places along a perimeter of a rotating drum of the metal coating device.

9. The fixture of claim 8, said plurality of arms being respectively fixed to said supporting rod by one end thereof, said plurality of arms being arranged in pairs at 90° to one another, the arms of one pair being positioned so that one arm thereof is fixed over said supporting rod, the arms of another pair being positioned so that one arm thereof is fixed below said supporting rod, said clamp means being positioned perpendicular to the respective arm to which said clamp means is attached, said clamp means comprising V-shaped jaws having opposing saw-tooth notches on inner sides thereof.

10. The fixtures of claim 8, said plurality of arms being fixed at a center thereof to said supporting rod, said plurality of arms being arranged in pairs arranged at a 90° angle with respect to each other, the arms of one of the pairs are positioned in parallel relationship, each of said plurality of arms having a pair of opposing clamps affixed thereto perpendicular to a longitudinal axis of said supporting rod, said pair of clamps comprising V-shaped jaws having opposing sawtooth notches on an inner surface thereof.

11. The fixture of claim 8, said plurality of arms comprising a pre-stressed metal bolt affixed at a center thereof to said supporting rod, said plurality of arms arranged in pairs arranged opposite to one another, said clamp mens comprising a conical plug formed on one side of an end of one arm of the pair, said clamp means comprising a cavity formed on one side of an end of another arm of the pair, the conical plug of one pair of arms being co-axial to the cavity of another pair of arms.

* * * * *